United States Patent Office 3,028,401
Patented Apr. 3, 1962

3,028,401
6-FLUORO-19-NOR-TESTOSTERONE
DERIVATIVES
Howard J. Ringold, Albert Bowers, and George Rosenkranz, Mexico City, Mexico, assignors to Syntex S.A., Mexico City, Mexico, a corporation of Mexico
No Drawing. Filed Nov. 21, 1958, Ser. No. 775,397
Claims priority, application Mexico Nov. 27, 1957
13 Claims. (Cl. 260—397.4)

The present invention relates to cyclopentanophenanthrene compounds.

More particularly the present invention relates to novel 19-nor testosterone derivatives having a 6-fluoro substituent. These include the androgenic type hormones 6α-fluoro-19-nor testosterone and its C–17 esters of hydrocarbon carboxylic acids of less than 12 carbon atoms having especially valuable anabolic properties. The novel compounds of the present invention also include derivatives of 6α-fluoro-19-nor-testosterone and its C–17 esters of hydrocarbon carboxylic acids having in addition a 17α-lower alkyl, or lower alkenyl or lower alkinyl group. These last mentioned compounds are potent progestational hormones. The present invention also includes 6β-fluoro compounds that are intermediates for the aforementioned 6α-fluoro compounds.

The novel compounds of the present invention are illustrated by the following formulas:

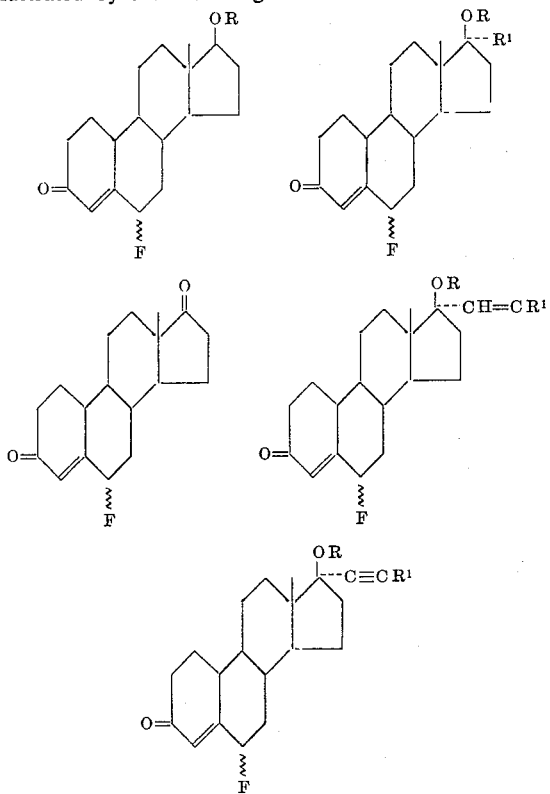

In the above formulas the fluorine atom may be either in the alpha or the beta configuration and R refers to the hydrogen atom or to a hydrocarbon carboxylic acyl group of up to 12 carbon atoms. These acyl groups may be saturated or unsaturated, straight chain or branched chain aliphatic, cyclic or mixed cyclic aliphatic and may be conventionally substituted as by methoxy or halogen. Typical acyl groups of this type are acetate, propionate, caproate, enanthate, hemisuccinate, cyclopentypropionate, benzoate, trimethylacetate, phenoxypropionate and β-chloropropionate. $R^1$ represents a lower alkyl group of up to 6 carbon atoms such as methyl, ethyl or propyl.

In general the novel compounds of the present invention are prepared by a process illustrated in part by the following equation:

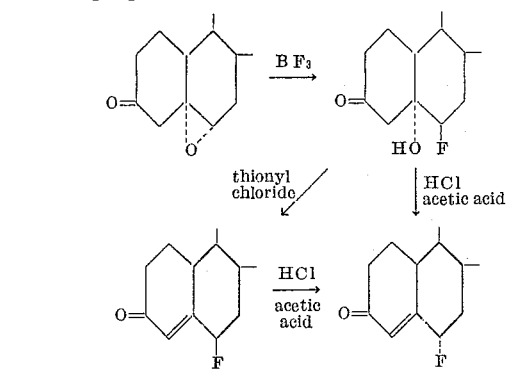

Although in the above equation the starting material is a 3-keto compound, this is by way of example only and groups convertible to 3-keto may be used.

The first step indicated above i.e. the fission of 5α,6α-oxido 19-nor androstane compounds with boron trifluoride or boron trifluoride-etherate or a similar complex is carried out in an organic solvent added in such a proportion as to effect a dissolution of the steroid, and preferably in an amount from 0.1 to 5 times the weight of boron trifluoride-etherate or an equivalent weight of boron trifluoride or similar complex.

As a solvent there is used organic solvents of low polarity, such as aliphatic or aromatic hydrocarbons, ethers, chlorinated or nitrated hydrocarbons either alone or in a mixture. Typical examples of such solvents of this type are hexane, benzene, diethylether, chloroform, nitromethane and tetrahydrofurane. The reaction is carried out at temperatures from −20° C. to the boiling point of a solvent or solvent mixture. In general, however, the reaction is best carried out at temperatures from 10 to 45° C. for maximum yields and satisfactory reaction rates. We found also that the reaction time necessary for carrying out the reaction may vary depending on the nature of the steroid and the solvent used. Thus for example 3-cyloethyleneketal-5α,6α-oxido 19-nor-androstane compounds were found to react faster than 3β-hydroxy-5α,6α-oxido 19-nor-androstane compounds or their esters. The quantity of boron trifluoride used is preferably in excess of the stoichiometric quantity and in general 1 cc. of boron trifluoride-etherate for each 1 g. of steroid epoxide has been found satisfactory. The reaction is usually complete in a few hours and in practice a reaction period of 3 to 24 hours has been used.

In practicing the first step above set forth the steroid is dissolved in the solvent or solvent mixture and boron trifluoride preferably in the form of its etherate or similar complex is then added while stirring. After a period of reaction as above set forth the resultant 5α-hydroxy 6β-fluoro compound is separated and purified. It may be noted that in the first step the steroid starting material is a 3-ketone. As previously set forth compounds having in the 3 position a group convertible to a 3-keto group may also be used as for example a 3-hydroxy or an acylated 3-hydroxy group or a cycloethylene ketal group. In these instances the 3-keto group must be or will be reconstituted prior to dehydration and/or inversion at C–6. Thus, if the starting material is a 3-hydroxy steroid there is formed after the reaction with $BF_3$ the corresponding 3,5α-dihydroxy 6β-fluoro compound which is selectively oxidized by a conventional treatment with chromic acid. If there is present in the starting material a 3-acyloxy group after the $BF_3$ step the acyloxy group of the product is first conventionally saponified as with alkali metal carbonate, bicarbonate or methoxide and the 3-hydroxy group is then oxidized. If the 3-substituent is a cycloethylene ketal group then this group may be either treated with mild acid immediately after the first step to regenerate the 3-keto radical or this may take place as a result of any subsequent dehydration involving the use of acid.

The 3-keto-5α-hydroxy-6β-fluoro products or their ketals as indicated are then directly dehydrated with concomitant inversion of the 6β-fluoro atom to 6α-fluoro atom. Such dehydration was preferably carried out using anhydrous mineral acids and an organic acid as solvent; the temperature is not critical in this reaction and best yields were obtained at temperatures from 5 to 20° C.; likewise, a reaction period of 2 to 8 hours was found to give most satisfactory results. Typical examples of mineral acids of this type are dry hydrogen chloride and sulfuric acid and typical examples of organic acids are glacial acetic acid, propionic acid or butyric acid; i.e. lower alophatic acids. In practicing the step above set forth the 5α-hydroxy-6β-fluoro steroid for example, is dissolved in glacial acetic acid and a stream of dry hydrogen is passed through the solution for 4 hours. After the reaction as above set forth, the resulting 6α-fluoro-$\Delta^4$-3-keto compound was separated and purified.

In the case where the 6β-fluoro was the desired product the 5α-hydroxy-6β-fluoro compound was dissolved in a basic solvent as for example pyridine, thionyl chloride was added and the temperature of the reaction mixture was kept preferably at below 0° C. Alternatively the process as above set forth was carried out using an alkali metal hydroxide as for example sodium hydroxide and an alcohol as ethanol.

Isolation and purification produced a 6β-fluoro-$\Delta^4$-keto-compound which was then converted into a 6α-fluoro-$\Delta^4$-3-keto compound by treatment with dry hydrogen chloride in acetic acid as above set forth, followed by isolation and purification.

As may be understood the above reaction is applicable in general to 19-nor androstane derivatives of the character set forth. However, in some instances as indicated in the following examples the same compounds may be conveniently produced either directly or by preparing a 19-nor androstane intermediate differing in the side chain from the final compound and the side chain subsequently modified by conventional methods. Thus, for example 6α-fluoro-$\Delta^4$-19-nor-androsten-3,17-dione may be an intermediate for the production of 6α-fluoro-19-nor-testosterone and the 6α-fluoro-19-nor-testosterone may also be prepared from 3-ethylenedioxy-5α,6α-oxido-19-nor-androstan-17β-ol.

The following specific examples serve to illustrate the present invention but are not intended to limit the same:

*Example I*

A mixture of 6 g. of 17α-ethinyl-19-nor-testosterone, 110 cc. of anhydrous benzene, 40 cc. of ethylene glycol previously distilled over sodium hydroxide, and 0.6 g. of p-toluenesulfonic acid was refluxed for 24 hours with the use of an adapter for the removal of the water formed during the reaction. Sodium bicarbonate solution was added to the cooled mixture and the organic layer was separated, washed with water, dried over anhydrous sodium sulfate, filtered and evaporated to dryness under reduced pressure. Crystallization of the residue from acetone-hexane afforded 17α-ethinyl-3-ethylenedioxy-19-nor-$\Delta^5$-androsten-17β-ol.

A solution of 5 g. of the above compound in 100 cc. of chloroform was cooled to 0° C., mixed with an ether solution of monoperphthalic acid containing 1.1 molar equivalents of the reagent and kept for 16 hours in the dark at a temperature between 0 and 5° C. The mixture was then diluted with water and the organic layer was separated, washed with water, sodium bicarbonate solution and again with water to neutral, dried over anhydrous sodium sulfate and evaporated under reduced pressure. The residue consisted of a mixture of 17α-ethinyl-3-ethylenedioxy - 5α,6α - oxido-19-nor-androstan-17β-ol and of 17α - ethinyl - 3 - ethylenedioxy - 5β,6β - oxido - 19 - nor - androstan-17-ol. Chromatography on neutral alumina yielded the pure 5α,6α-oxido compound.

*Example II*

A mixture of 1 g. of 17α-ethinyl-19-nor-testosterone, 10 cc. of pyridine and 2 cc. of propionic anhydride was heated under reflux for 18 hours and then poured into ice water. The product was extracted with methylene dichloride and the extract was washed with dilute hydrochloric acid, water, aqueous sodium bicarbona solution and finally again with water, dried over anhydrous sodium sulfate, filtered and evaporated to dryness.

The product thus obtained was dissolved in 100 cc. of 1% methanolic potassium hydroxide previously cooled to 5–10° C. and the mixture was kept at this temperature for 1 hour; it was then neutralized with acetic acid, concentrated to a small volume and poured into water. The precipitate was collected by filtration, washed with water, dried and recrystallized from acetone-hexane. There was thus obtained 17α-ethinyl-19-nor-testosterone propionate.

Following the method described in Example I, the above compound was converted into 17α-ethinyl-3-ethylenedioxy-19-nor-$\Delta^5$-androsten - 17β - ol propionate and then, by oxidation of the double bond of this ketal, into 17α - ethinyl - 3 - ethylenedioxy - 5α,6α - oxido - 19 - nor-androstan-17β-ol propionate.

*Example III*

By substituting in the methods of the previous examples the ethyleneglycol for propyleneglycol, there were obtained 17α-ethinyl-3-propylenedioxy-19-nor-$\Delta^5$-androsten-17β-ol, 17α-ethinyl - 3 - propylenedioxy-5α,6α-oxido-19-nor-androstan-17β-ol and the propionates of such compounds, respectively.

*Example IV*

Following the methods of Examples I to III and substituting in the method of Example II a different anhydride of a hydrocarbon carboxylic acid of less than 12 carbon atoms there were prepared the corresponding esters. Specifically there were prepared the acetate, butyrate, caproate, benzoate, trimethylacetate and cyclopentylpropionate.

*Example V*

To a solution of 3 g. of 17α-ethinyl-3-ethylenedioxy-5α,6α-oxido - 19 - nor-androstan-17β-ol in 300 cc. of a mixture of equal parts of ether and benzene there was added 3 cc. of boron trifluoride etherate and the mixture was kept at room temperature for 3 hours and then poured into water. The organic layer was separated, washed with water, dried over anhydrous sodium sulfate, filtered and evaporated to dryness. Chromatographic purification of the residue on neutral alumina furnished 17α - ethinyl - 6β - fluoro - 3 - ethylenedioxy - 19 - nor - androstan-5α,17β-diol.

A slow stream of dry hydrogen chloride was introduced for 3 hours into a solution of 2 g. of the above compound in 100 cc. of glacial acetic acid, while the temperature of the mixture was kept below 18° C. After pouring into ice water the precipitate was filtered, washed with water and recrystallized from acetone-hexane. There was thus obtained 17α-ethinyl-6α-fluoro-19-nor-testosterone.

*Example VI*

A mixture of 2 g. of 17α-ethinyl-6β-fluoro-3-ethylenedioxy-19-nor-androstan-5α,17β-diol, prepared in accordance with the previous example, 150 cc. of acetone, 5 cc. of water and 400 mg. of p-toluenesulfonic acid was kept at room temperature for 6 hours and then diluted with water. The precipitate formed was collected, washed with water and dried in vacuo. Recrystallization from acetone-hexane yielded 17α - ethinyl - 6β - fluoro-19-nor-androstan-5α,17β-diol-3-one.

A solution of 1 g. of the above compound in 50 cc. of glacial acetic acid was treated with dry hydrogen chloride and then worked up by the procedure described in Example V, thus producing 17α-ethinyl-6α-fluoro-testosterone identical with the one obtained in such example.

*Example VII*

A mixture of 1 g. of 17α-ethinyl-6β-fluoro-19-nor-androstan-5α,17β-diol-3-one, obtained in accordance with Example VI, and 70 cc. of a solution of potassium hydroxide in methanol containing 150 mg. of the reagent was refluxed under an atmosphere of nitrogen for 45 minutes. The mixture was acidified with a few drops of acetic acid, concentrated to a small volume, diluted with water and the precipitate formed was filtered, washed with water and dried. Chromatography on neutral alumina furnished 17α-ethinyl-6β-fluoro-19-nor-testosterone.

By means of the reaction with dry hydrogen chloride in glacial acetic acid solution described in Example V, there was inverted the steric configuration at C–6 of the above compound, thus giving 17α-ethinyl-6α-fluoro-19-nor-testosterone, identical with the final product obtained in the previous examples.

*Example VIII*

By the methods of Examples V, VI and VII, there were obtained the acetates of 17α-ethinyl-6α-fluoro-19-nor-testosterone, of 17α - ethinyl-6β-fluoro-19-nor-androstan-5α,17β-diol-3-one and of 17α-ethinyl-6β-fluoro-19-nor-testerone, respectively, starting from the acetate of 17α-ethinyl - 3 - ethylenedioxy-5α,6α-oxido-19-nor-androstan-17β-ol. By starting with the other esters of Example IV there were prepared the same corresponding ester compounds.

*Example IX*

A mixture of 6 g. of 19-nor-Δ4-androsten-3,17-dione, 120 cc. of dry benzene, 45 cc. of ethylene glycol distilled over sodium hydroxide and 800 mg. of p-toluenesulfonic acid was refluxed for 24 hours with the use of an adapter for the removal of the water formed during the reaction. The cooled mixture was treated with aqueous sodium bicarbonate solution and the organic phase was separated and washed with water, dried over anhydrous sodium sulfate and evaporated to dryness under reduced pressure. The residue was purified by chromatography on neutral alumina, thus giving 3,17-bis-ethylenedioxy-19-nor-Δ5-androstene.

A solution of 5 g. of the above bis-ketal in 100 cc. of chloroform was cooled to 0° C. and mixed with an ether solution of monoperphthalic acid containing 1.2 molar equivalents of the reagent. The mixture was kept for 16 hours at a temperature of 0–5° C. in the dark and then diluted with water. The organic phase was washed with water, dried over anhydrous sodium sulfate and evaporated to dryness under reduced pressure. The residue consisted of a mixture of 3,17-bis-ethylendioxy-5α,6α-oxido-19-nor-androstane and of its 5β,6β-isomer. The pure 5α,6α-isomer was obtained by chromatography.

4 cc. of boron trifluoride etherate was added to a solution of 4 g. of the above compound in a mixture of 200 cc. of ether and 200 cc. of benzene and the mixture was kept at room temperature for 3 hours. After diluting with water, the organic phase was washed with water, dried over anhydrous sodium sulfate, filtered and evaporated to dryness. The residue was purified by chromatography on neutral alumina, thus yielding 6β-fluoro-3,17-bis-ethylenedioxy-19-nor-androstan-5α-ol.

3 g. of this bis-ketal was dissolved in a mixture of 200 cc. of acetone and 5 cc. of water, treated with 600 mg. of p-toluenesulfonic acid and kept at room temperature for 6 hours. The mixture was diluted with water and the precipitate was filtered, washed with water, dried in vacuo and recrystallized from acetone-hexane. There was thus obtained 6β-fluoro-19-nor-androstan-5α-ol-3,20-dione.

A slow stream of dry hydrogen chloride was introduced for 4 hours into a solution of 1.5 g. of the above compound in 75 cc. of glacial acetic acid, while the temperature was maintained below 18° C. After pouring the mixture into ice water the precipitate was collected, washed with water, dried and recrystallized from acetone-hexane. There was thus obtained 6α-fluoro-19-nor-Δ4-androsten-3,17-dione.

*Example X*

1.5 g. of 6β-fluoro-3,17-bis-ethylenedioxy-19-nor-androstan-5α-ol, obtained as described in the previous example, was dissolved in 75 cc. of glacial acetic acid and the solution was treated with dry hydrogen chloride as described for this reaction in the same example, thus producing, with the simultaneous hydrolysis of the ketal groups, 6α-fluoro-19-nor-Δ4-androsten-3,17-dione, identical with the final compound of the previous example.

*Example XI*

To a solution of 1 g. of 6α-fluoro-19-nor-Δ4-androsten-3,17-dione in 50 cc. of tetrahydrofurane there was added 800 mg. of lithium aluminum hydride and the mixture was refluxed for 1 hour. The excess of hydride was destroyed by cautiously adding a few drops of ethyl acetate to the cooled solution and then saturated aqueous sodium sulfate solution was added. The precipitate was filtered and the filtrate was evaporated to dryness, thus giving the crude 6α-fluoro-19-nor-Δ4-androsten-3,17β-diol which consisted of a mixture of the 3α and 3β isomers. In another experiment the mixture was resolved by chromatography.

500 mg. of the mixture of isomers of the above diol was dissolved in 50 cc. of chloroform, treated with 5 g. of manganese dioxide and the mixture was stirred at room temperature for 24 hours. The solid was removed by filtration and the filtrate was evaporated to dryness. Crystallization of the residue from acetone-hexane furnished 6α-fluoro-19-nor-testosterone.

*Example XII*

A solution of 5 g. of 6α-fluoro-19-nor-Δ4-androsten-3,17-dione in 35 cc. of anhydrous dioxane was treated with 5 cc. of ethyl orthoformate and 150 mg. of p-toluenesulfonic acid and the mixture was stirred for 30 minutes; 12 cc. of pyridine and 500 cc. of water were slowly added with stirring and cooling. An oil separated which crystallized after cooling for 2 hours. The precipitate was collected, washed with water, dried and recrystallized from methanol. There was thus obtained 3-ethoxy-6-fluoro-19-nor-Δ3,5-androstadien-17-one.

5 g. of the above enol-ether was dissolved in 100 cc. of anhydrous benzene and the solution was added to 25 cc. of a 3 N solution of methyl magnesium bromide in anhydrous ether; the mixture was stirred for 12 hours, poured into aqueous ammonium chloride solution and stirred; the organic layer was separated, washed with water, dried over anhydrous sodium sulfate, filtered and evaporated to dryness. There was thus obtained 3- ethoxy-17α-methyl - 6 - fluoro-19-nor-Δ$^{3,5}$-androstadien-17β-ol in crude form. The pure substance was obtained by chromatography.

3 g. of the above compound was dissolved in 300 cc. of methanol containing 30 cc. of 8% (v./v.) sulfuric acid and the solution was refluxed for 40 minutes, cooled, neutralized with aqueous sodium bicarbonate solution and the methanol was evaporated. After cooling the crystalline precipitate was filtered, washed with water, dried and recrystallized from acetone-hexane, thus producing 17α-methyl-6α-fluoro-19-nor-testosterone.

*Example XIII*

A cooled solution of 2 g. of 3-ethoxy-6-fluoro-19-nor-Δ$^{3,5}$-androstadien-17-one, obtained in accordance with the previous example, in a mixture of 125 cc. of absolute ether and 125 cc. of dry benzene was treated with 45 cc. of an ether solution of ethyl lithium containing 10 equivalents of this reagent, which was added dropwise under an atmosphere of nitrogen. The mixture was kept at room temperature under nitrogen for 48 hours and then poured into ice water; the organic layer was separated, washed with water, dried over anhydrous sodium sulfate, filtered and concentrated until the product crystallized abundantly. The mixture was cooled and the precipitate was filtered and recrystallized from acetone-hexane. There was thus obtained 3-ethoxy-17α-ethyl-6-fluoro-19-nor-Δ$^{3,5}$-androstadien-17β-ol which was then treated with dilute sulfuric acid in methanol solution, such as described in the previous example, to furnish 17α-ethyl-6α-fluoro-19-nor-testosterone.

*Example XIV*

By substituting in the method of the previous example for the ethyl lithium, propyl lithium, there were obtained 3-ethoxy-17α-propyl - 6 - fluoro-19-nor-Δ$^{3,5}$-androstadien-17β-ol and finally 17α-propyl-6α-fluoro-19-nor-testosterone.

*Example XV*

A solution of 2 g. of 3-ethoxy-6-fluoro-19-nor-Δ$^{3,5}$-androstadien-17-one, obtained in accordance with Example XIII, in 60 cc. of anhydrous toluene was mixed with a solution of 2 g. of potassium metal in 60 cc. of tertiary amyl alcohol, prepared under nitrogen and with slight heating, which was added slowly, with stirring and under an atmosphere of nitrogen. A slow stream of nitrogen was then introduced into the mixture for 15 minutes followed by a slow stream of washed acetylene for 15 hours. After pouring into water the mixture was acidified with hydrochloric acid, extracted with ether and the extract was washed with water, dried over anhydrous sodium sulfate, filtered and evaporated to dryness. The residue consisted of the crude 3-ethoxy-17α-ethinyl-6-fluoro-19-nor-Δ$^{3,5}$-androstadien-17β-ol. In another experiment this substance was obtained in pure form by chromatography of the crude product on neutral alumina.

The above crude compound was then treated with dilute sulfuric acid in methanol solution in accordance with the method described in Example XII. There was thus obtained 17α-ethinyl-6α-fluoro-19-nor-testosterone.

When the acetylene of the foregoing procedure was substituted by methylacetylene or by ethylacetylene there was produced 17α-propinyl-(1)-6α-fluoro-19-nor-testosterone and 17α-butinyl-(1)-6α-fluoro-19-nor-testosterone respectively.

*Example XVI*

6 g. of magnesium metal was covered with 40 cc. of anhydrous tetrahydrofurane and then a crystal of iodine and 1 g. of vinyl bromide were added. When the reaction started the mixture was cooled and then there was added a solution of 1 g. of 3-ethoxy-6-fluoro-19-nor-Δ$^{3,5}$-androstadien-17-one in a mixture of 12 g. of vinyl bromide and 100 cc. of ether; the addition was effected with stirring and cooling in the course of 4 hours. The mixture was stirred for 3 hours further at room temperature, poured into ice water containing 20 g. of ammonium chloride, acidified with dilute hydrochloric acid and extracted with several portions of ether. The extract was washed with water, dried over anhydrous sodium sulfate, filtered and evaporated to dryness. The residue consisted of the crude 3-ethoxy - 17α - vinyl-6-fluoro-19-nor-Δ$^{3,5}$-androstadien-17β-ol. Chromatography of a portion of this compound on neutral alumina furnished the pure substance.

The above crude compound was then treated with dilute sulfuric acid in methanol solution in accordance with the method described in Example XV. There was thus obtained 17α-vinyl-6α-fluoro-19-nor-testosterone.

*Example XVII*

By substituting in the method of the previous example for the vinyl bromide, allyl bromide, there was obtained as an intermediate 3-ethoxy - 17α - allyl-6-fluoro-19-nor-Δ$^{3,5}$-androstadien-17β-ol and as final compound 17α-allyl-6α-fluoro-19-nor-testosterone.

*Example XVIII*

1 g. of 6α-fluoro-19-nor-testosterone was dissolved in 5 cc. of acetic anhydride, treated with 100 mg. of p-toluenesulfonic acid and the mixture was stirred at room temperature for 12 hours, poured into water, heated on the steam bath for half an hour and cooled. The precipitate consisting of the diacetate of 6-fluoro-19-nor-Δ$^{3,5}$-androstadien-3,17β-diol was filtered, washed with water, dried and redissolved in 100 cc. of 1% methanolic potassium hydroxide previously cooled to 5–10° C. The mixture was kept at this temperature for one hour, acidified with acetic acid, concentrated to a small volume and diluted with water. The precipitate formed was collected, washed with water, dried and recrystallized from acetone-hexane. There was thus obtained 6-fluoro-19-nor-testosterone 17-acetate.

*Example XIX*

1 g. of 17α-ethinyl-6α-fluoro-19-nor-testosterone was dissolved in 10 cc. of pure benzene, treated with 2 cc. of propionic anhydride and 100 mg. of p-toluenesulfonic acid and the mixture was stirred at room temperature for 20 hours. Following the procedure described in the previous example, there was obtained 17α-ethinyl-6α-fluoro-19-nor-testosterone 17-propionate.

*Example XX*

By the method of Examples XVIII and XIX, there was esterified the hydroxyl group of all of the 6-fluoro-17α-alkyl(alkenyl, alkinyl)-19-nor-testosterones of the previous examples.

The anhydrides used in the methods of Examples XVIII and XIX can be derived from a hydrocarbon carboxylic acid, saturated or unsaturated, of straight or branched chain, cyclic or mixed cyclic-aliphatic, substituted or not with methoxy, halogen or other groups; there were thus obtained the corresponding 17-esters of 6α-fluoro-19-nor-testosterone, 17α-methyl - 6α - fluoro-19-nor-testosterone, 17α-propyl-6α-fluoro-19-nor-testosterone, 17α-ethinyl-6α-fluoro-19-nor-testosterone, 17α-vinyl - 6α - fluoro-19-nor-testosterone and 17α-allyl-6α-fluoro-19-nor-testosterone, respectively, as well as their respective 3-enol-ester-17-esters. In addition to the acetates and propionates there were specifically prepared the cyclopentylpropionates and benzoates.

*Example XXI*

A solution of 5 g. of 17α-ethinyl-19-nor-Δ$^5$-androsten-3β,17β-diol in 100 cc. of chloroform was treated with an ether solution of monoperphthalic acid containing 1.2 molar equivalents of the reagent and the mixture was allowed to react at room temperature in the dark for 20 hours. It was then diluted with water, the organic layer was separated and washed with aqueous sodium bicarbonate solution and water, dried over anhydrous sodium sulfate and evaporated to dryness under reduced pressure. The residue was purified by chromatography on neutral alumina to produce 17α-ethinyl-5α,6α-oxido-19-nor-androstan-3β,17β-diol.

3 g. of the above compound was dissolved in a mixture of 150 cc. of ether and 150 cc. of benzene, cooled to 0° C. and treated dropwise with stirring with 3 cc. of boron trifluoride etherate. After 3 hours standing at room temperature, the mixture was diluted with water and the organic layer was washed with water, dried over anhydrous sodium sulfate and evaporated to dryness. Chromatographic purification of the residue on neutral alumina yielded 17α-ethinyl-6β-fluoro-19-nor-androstan-3β,5α,17β-triol.

A solution of 2 g. of the above triol in 100 cc. of acetone was cooled to 0° C. and treated with an 8 N solution of chromic acid prepared by mixing chromium trioxide, concentrated sulfuric acid and water; the reagent was added to the stirred solution kept at 0° C. under nitrogen, in the course of approximately 3 minutes, until the yellow color of the mixture persisted. The stirring was continued for a further 5 minutes at 0° C. and then the mixture was diluted with water and extracted with ether. The extract was washed with water, dried over anhydrous sodium sulfate and evaporated to dryness. Recrystallization of the residue from ethyl acetate furnished 17α-ethinyl-6β-fluoro-19-nor-androstan-5α,17β-diol-3-one.

1 g. of 17α-ethinyl-6β-fluoro-19-nor-androstan-5α,17β-diol-3-one was mixed with 50 cc. of glacial acetic acid and a slow stream of dry hydrogen chloride was introduced into the mixture for 2 hours while the temperature was kept below 18° C. The mixture was poured into water and the precipitate formed was collected by filtration, washed with water, dried and recrystallized from acetone-hexane, thus giving 17α-ethinyl-6α-fluoro-19-nor-testosterone.

*Example XXII*

By applying the method described in Example XXI, to the 17-acetate of 17α-ethinyl-19-nor-Δ⁵-androsten-3β,17β-diol, there were obtained as intermediates the 17-acetates of 17α-ethinyl-5α,6α-oxido-19-nor-androstan-3β,17β-diol, of 17α-ethinyl-6β-fluoro-19-nor-3β,5α,17-triol and of 17α-ethinyl-6β-fluoro-19-nor-androstan-5α,17β-diol-3-one, and the final product was the 17-acetate of 17α-ethinyl-6α-fluoro-19-nor-testosterone.

*Example XXIII*

A suspension of 100 mg. of 2% palladium on calcium carbonate catalyst in 20 cc. of pure pyridine was stirred under hydrogen until the uptake of hydrogen ceased; there was then added 1 g. of 17α-ethinyl-6α-fluoro-19-nor-testosterone and the mixture was hydrogenated at room temperature and atmospheric pressure until the uptake of hydrogen became slow after one molar equivalent of hydrogen had been absorbed, which took approximately half an hour. The catalyst was removed by filtration and washed with a little ethyl acetate and the combined filtrate and washings was diluted with more ethyl acetate and diluted with water. The layer of ethyl acetate was washed with dilute hydrochloric acid, water, aqueous sodium bicarbonate solution and again with water to neutral, dried over anhydrous sodium sulfate and evaporated to dryness under reduced pressure. Recrystallization of the residue from acetone-hexane furnished 17α-vinyl-6α-fluoro-19-nor-testosterone.

In another experiment, following the method described above, the acetate of 17α-ethinyl-6α-fluoro-19-nor-testosterone was converted into the acetate of 17α-vinyl-6α-fluoro-19-nor-testosterone.

*Example XXIV*

100 mg. of 17α-vinyl-6α-fluoro-19-nor-testosterone in 20 cc. of dioxane was hydrogenated in the presence of 40 mg. of a previously reduced 5% palladium on charcoal catalyst, at room temperature and atmospheric pressure. When the equivalent of one mol of hydrogen had been absorbed the catalysts was removed by filtration and washed with a little dioxane. The combined filtrate and washings was evaporated to dryness under reduced pressure and the residue crystallized from acetone-hexane, thus furishing 17α-ethyl-6α-fluoro-19-nor-testosterone.

Following the method described above, 17α-ethinyl-6α-fluoro-19-nor-testosterone was hydrogenated to its 17α-ethyl analogue with the absorption of 2 molar equivalents of hydrogen.

*Example XXV*

In other experiments there were applied the methods of Examples XXI and XXII to the 17α-methyl, ethyl propyl and butyl analogues of 19-nor-Δ⁵-androsten-3β,17β-diol and their 17-esters; there were thus obtained the intermediate compounds and the final products substituted at C–17α with the corresponding alkyl group, as well as the respective 17-esters.

*Example XXVI*

In other experiments, following the methods described in Examples XXI and XXII, there were used as starting materials the 17α-alkinyl derivatives of 19-nor-Δ⁵-androsten-3β,17β-diol or their 17-esters, where the alkinyl group was propinyl (—1) or butinyl (—1). There were thus obtained the intermediate compounds as well as the final 17α-alkinyl-6α-fluoro-19-nor-testosterones having the corresponding 17α-alkinyl substituents. Following the methods of Examples XXIII and XXIV, those alkinyl groups were hydrogenated to the corresponding alkenyl groups or completely hydrogenated to the alkyl groups. There were thus obtained: from 17α-propinyl (—1)-19-nor-Δ⁵-androsten-3β,17β-diol, the 6α-fluoro-19-nor-testosterones substituted at C–17α with the propinyl, propenyl or propyl group, respectively; from 17α-butinyl-19-nor-Δ⁵-androsten-3β,17β-diol there were obtained the 6α-fluoro-19-nor-testosterone substituted at C–17α with the butinyl, butenyl or butyl group respectively; when the starting diol was esterified at C–17 then there were obtained the corresponding 17-esters. The C–17 esters were formed with a radical of a hydrocarbon carboxylic acid of less than 12 carbon atoms, of straight or branched chain, cyclic or mixed cyclic-aliphatic, substituted or not with methoxy, halogen or other groups, to produce esters such as the acetate, propionate, butyrate, enanthate, caproate, hemisuccinate, benzoate, trimethylacetate, cyclopentylpropionate, phenoxyacetate, 4-methylcyclohexanecarboxylate, β-chloropropionate and 2,4-dichlorophenoxyacetate.

We claim:
1. A compound of the following formula:

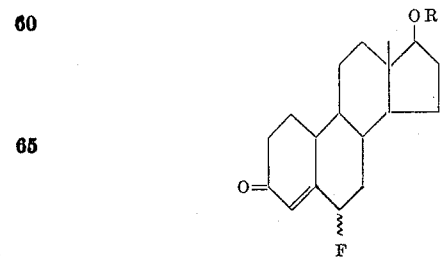

wherein R is selected from the group consisting of hydrogen and a hydrocarbon carboxylic acyl group of less than 12 carbon atoms.

2. 6α-fluoro-19-nor-testosterone.

3. The hydrocarbon carboxylic acid esters of less than 12 carbon atoms of 6α-fluoro-19-nor-testosterone.

4. A compound of the following formula:

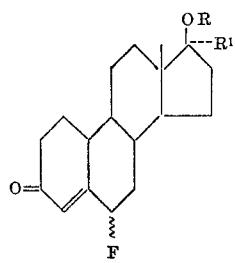

wherein R is selected from the group consisting of hydrogen and a hydrocarbon carboxylic acyl group of less than 12 carbon atoms and $R^1$ is a lower alkyl group.

5. 6α-fluoro-17α-lower alkyl-19-nor-Δ⁴-androsten-17β-ol-3-one.

6. The hydrocarbon carboxylic esters of less than 12 carbon atoms of 6α-fluoro-17α-lower alkyl-19-nor-Δ⁴-androsten-17β-ol-3-one.

7. A compound of the following formula:

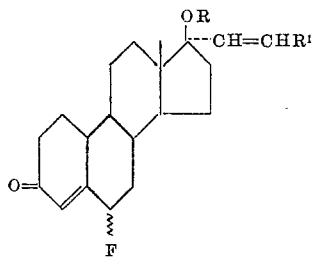

wherein R is selected from the group consisting of hydrogen and a hydrocarbon carboxylic acyl group of less than 12 carbon atoms and $R^1$ is a lower alkyl group.

8. 6α-fluoro-17α-lower alkenyl-19-nor - Δ⁴ - androsten-17β-ol-3-one.

9. The hydrocarbon carboxylic acid esters of less than 12 carbon atoms of 6α-fluoro-17α-lower alkenyl-19-nor-Δ⁴-androsten-17β-ol-3-one.

10. A compound of the following formula:

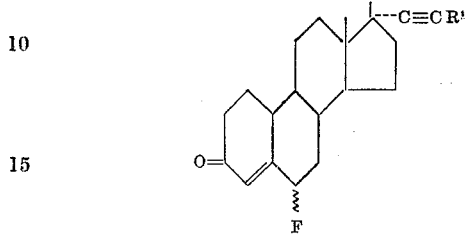

wherein R is selected from the group consisting of hydrogen and a hydrocarbon carboxylic acyl group of less than 12 carbon atoms and $R^1$ is a lower alkyl group.

11. 6α - fluoro-17α-lower alkinyl-19-nor-Δ⁴-androsten-17β-ol-3-one.

12. The hydrocarboxylic acid esters of less than 12 carbon atoms of 6α-fluoro-17α-lower alkinyl-19-nor-Δ⁴-androsten-17β-ol-3-one.

13. 6α-fluoro-19-nor-Δ⁴-androsten-3,17-dione.

References Cited in the file of this patent
UNITED STATES PATENTS

| | | |
|---|---|---|
| 2,838,490 | Babcock et al. | June 10, 1958 |
| 2,838,492 | Pederson et al. | June 10, 1958 |
| 2,838,500 | Campbell et al. | June 10, 1958 |
| 2,843,609 | Colton | July 15, 1958 |
| 2,845,381 | Tindall | July 29, 1958 |